US011864195B2

(12) United States Patent
Wang et al.

(10) Patent No.: US 11,864,195 B2
(45) Date of Patent: Jan. 2, 2024

(54) PEER-TO-PEER CITIZENS BROADBAND RADIO SERVICE GRANT

(71) Applicant: Google LLC, Mountain View, CA (US)

(72) Inventors: Jibing Wang, San Jose, CA (US); Erik Richard Stauffer, Sunnyvale, CA (US); Sathish Karunakaran, Los Altos, CA (US)

(73) Assignee: Google LLC, Mountain View, CA (US)

( * ) Notice: Subject to any disclaimer, the term of this patent is extended or adjusted under 35 U.S.C. 154(b) by 323 days.

(21) Appl. No.: 17/429,283

(22) PCT Filed: Apr. 14, 2020

(86) PCT No.: PCT/US2020/028150
§ 371 (c)(1),
(2) Date: Aug. 6, 2021

(87) PCT Pub. No.: WO2020/223010
PCT Pub. Date: Nov. 5, 2020

(65) Prior Publication Data
US 2022/0240304 A1 Jul. 28, 2022

Related U.S. Application Data

(60) Provisional application No. 62/839,983, filed on Apr. 29, 2019.

(51) Int. Cl.
*H04W 72/23* (2023.01)
*H04W 4/021* (2018.01)

(52) U.S. Cl.
CPC ........... *H04W 72/23* (2023.01); *H04W 4/021* (2013.01)

(58) Field of Classification Search
CPC ..... H04W 72/23; H04W 4/021; H04W 28/16; H04W 16/14; H04W 48/04; H04W 76/14;
(Continued)

(56) References Cited

U.S. PATENT DOCUMENTS

| 10,271,351 B1 | 4/2019 | Wang |
| 2007/0111742 A1 | 5/2007 | Zhang et al. |

(Continued)

FOREIGN PATENT DOCUMENTS

| WO | 2017061913 | 4/2017 |
| WO | 2017195152 | 11/2017 |
| WO | 2020223010 | 11/2020 |

OTHER PUBLICATIONS

"CBRS Spectrum Sharing Model in US", Retrieved at: http://www.3gpp.org/ftp/tsg%5Fran/TSG%5FRAN/TSGR%5F69/Docs/RP%2D15154%2Ezip, Sep. 2015, 6 pages.

(Continued)

*Primary Examiner* — Yuwen Pan
*Assistant Examiner* — Angelica Perez
(74) *Attorney, Agent, or Firm* — Colby Nipper PLLC

(57) ABSTRACT

This document describes methods, devices, systems, and means for a peer-to-peer Citizens Broadband Radio Service, CBRS, grant. A base station sends a CBRS spectrum request to a Spectrum Access System, SAS, receives a CBRS spectrum grant from the SAS, and transmits a configuration for peer-to-peer, P2P, CBRS communication to at least a first UE that is effective to enable the first UE and a second UE to conduct P2P communication based on the configuration for P2P CBRS communication.

20 Claims, 6 Drawing Sheets

(58) Field of Classification Search
CPC ... H04W 72/231; H04W 72/25; H04W 72/40; H04W 72/53; H04W 72/535; H04W 72/541; H04W 72/56; H04W 76/23; H04W 76/45; H04W 16/20; H04W 16/225; H04W 48/12; H04W 28/24; H04W 28/18; H04W 28/20; H04W 4/10; H04W 4/185; H04W 4/21; H04W 4/30; H04W 4/33; H04W 4/029; H04W 4/025; H04W 4/023; H04W 74/00; H04W 74/006; H04W 74/02; H04W 74/0875; H04W 76/15
See application file for complete search history.

(56) References Cited

U.S. PATENT DOCUMENTS

| | | |
|---|---|---|
| 2012/0163235 A1 | 6/2012 | Ho et al. |
| 2016/0119963 A1 | 4/2016 | Casati |
| 2017/0245280 A1 | 8/2017 | Yi |
| 2017/0303238 A1* | 10/2017 | Fodor .................. H04W 72/02 |
| 2019/0115950 A1* | 4/2019 | Kakinada .............. H04W 76/15 |
| 2019/0150134 A1 | 5/2019 | Kakinada et al. |
| 2019/0215698 A1* | 7/2019 | Balachandran ....... H04W 88/12 |
| 2020/0037175 A1* | 1/2020 | Sevindik ............... H04W 76/15 |
| 2020/0275457 A1 | 8/2020 | Hmimy |

OTHER PUBLICATIONS

"International Preliminary Report on Patentability", Application No. PCT/US2020/028150, dated Jul. 22, 2021, 8 pages.

"International Search Report and Written Opinion", Application No. PCT/US2020/028150, dated Jul. 13, 2020, 15 pages.

"Signaling Protocols and Procedures for Citizens Broadband Radio Service (CBRS)", Document WINNF-TS-0016 Version V1.2.4, Jun. 26, 2019, The Software Defined Radio Forum Inc., Jun. 26, 2019, 60 pages.

Sahoo, et al., "A Study of Timing Constraints and SAS Overload of SAS-CBSD Protocol in the CBRS Band", Jul. 15, 2021, 6 pages.

* cited by examiner

PEER-TO-PEER CITIZENS BROADBAND RADIO SERVICE GRANT

RELATED APPLICATION(S)

This application is a national stage entry of International Application No. PCT/US2020/028150, filed Apr. 14, 2020, which in turn claims priority to U.S. Provisional Application No. 62/839,983, filed Apr. 29, 2019, the disclosures of which are incorporated herein by reference in their entireties.

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

In some cases, Citizens Broadband Radio Service (CBRS) networks offer additional radio spectrum to supplement the radio spectrum allocated to Long-Term Evolution (LTE) and 5G air interfaces. The CBRS radio band is a 150 MHz-wide radio band of the 3.5 GHz-frequency band (3,550 MHz to 3,700 MHz). The CBRS band is shared radio spectrum with three tiers of users with different priority levels for access to the CBRS spectrum. A Spectrum Access System (SAS) protects incumbent and/or higher priority users from lower-priority, General Authorized Access (GAA) users. A user equipment (UE) may operate as a GAA device in the CBRS frequency band, but before the UE may operate in the CBRS band the UE must receive a spectrum grant from the SAS.

SUMMARY

This summary is provided to introduce simplified concepts of a peer-to-peer Citizens Broadband Radio Service grant. The simplified concepts are further described below in the Detailed Description. This summary is not intended to identify essential features of the claimed subject matter, nor is it intended for use in determining the scope of the claimed subject matter.

In some aspects, a method for configuring peer-to-peer (P2P) communication in a Citizens Broadband Radio Service (CBRS) between a first user equipment (UE) and a second UE is described in which a base station sends a CBRS spectrum request to a Spectrum Access System (SAS) and receives a CBRS spectrum grant from the SAS. Based on the reception of the CBRS spectrum grant, the base station transmits a configuration for P2P CBRS communication to at least the first UE that enables the first UE and the second UE to conduct P2P communication.

In another aspect, a base station is described that includes a radio frequency (RF) transmitter, a core network interface, and a processor and memory system to implement a base station manager application. The base station manager application is configured to send, using the core network interface, a Citizens Broadband Radio Service (CBRS) spectrum request to a Spectrum Access System (SAS), receive a CBRS spectrum grant from the SAS, and transmit, using the RF transmitter, a configuration for P2P CBRS communication to at least a first UE to enable the first UE and a second UE to conduct P2P communication.

In a further aspect, a method for configuring peer-to-peer (P2P) communication in a Citizens Broadband Radio Service (CBRS) between a first user equipment (UE) and a second UE is described in which the first UE receives a configuration for P2P CBRS communication with the second UE that includes a geofence that defines a geographic region for the P2P CBRS communication. The first UE establishes a P2P CBRS communication link with the second UE and determines a geographic location of the first UE. Using the determined geographic location, the first UE continues P2P CBRS communication with the second UE if the determined geographic location of the first UE is inside the geofence or discontinues P2P CBRS communication with the second UE if the determined geographic location of the first UE is outside the geofence.

BRIEF DESCRIPTION OF THE DRAWINGS

Aspects of a peer-to-peer Citizens Broadband Radio Service grant are described with reference to the following drawings. The same numbers are used throughout the drawings to reference like features and components.

DETAILED DESCRIPTION

Figure 1:
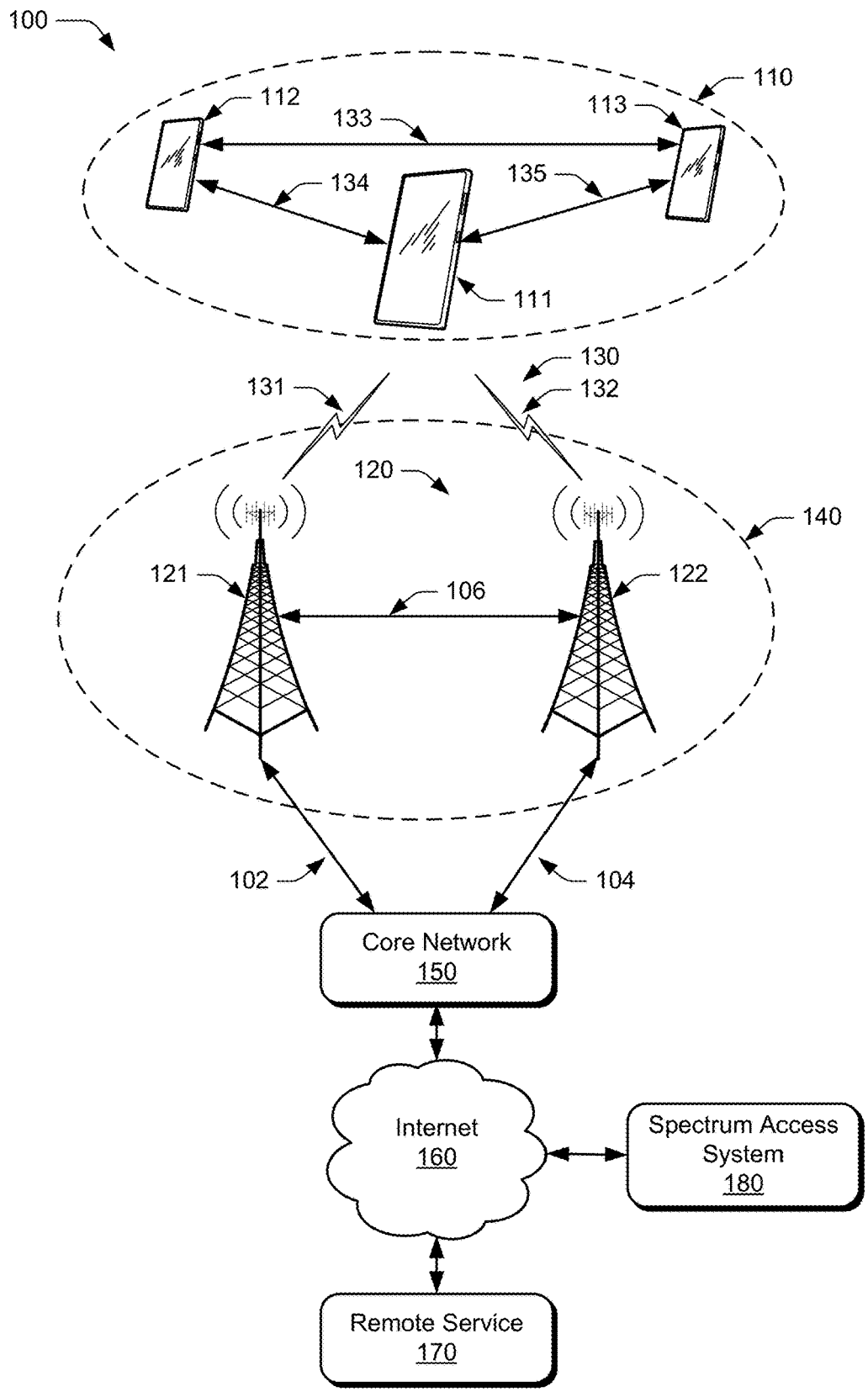
FIG. 1 illustrates an example wireless network system in which various aspects of a peer-to-peer Citizens Broadband Radio Service grant can be implemented.

This document describes methods, devices, systems, and means for a peer-to-peer Citizens Broadband Radio Service (CBRS) grant. A base station sends a CBRS spectrum request to a Spectrum Access System (SAS), receives a CBRS spectrum grant from the SAS, and transmits a configuration for peer-to-peer (P2P) CBRS communication to at least a first UE that is effective to enable the first UE and a second UE to conduct P2P communication based on the configuration for P2P CBRS communication.

The Citizens Broadband Radio Service (CBRS) provides 150 MHz of radio spectrum in the 3.5 GHz band. The CBRS band is shared radio spectrum with three tiers of users with different priority levels for access to the CBRS spectrum. Tier 1 in the CBRS includes incumbent users, such as the federal government and fixed satellite users. Tier 2 is a licensed band for users with a Priority Access License (PAL) that is acquired through an auction. PAL users must protect incumbent Tier 1 users from harmful interference. Tier 3 is for General Authorized Access (GAA) users that deploy "lightly-licensed" devices that conform to regulatory regime for CBRS devices (CBDSs). GAA users must protect both Tier 1 incumbents and Tier 2 PAL users from harmful interference.

A GAA user can use the CBRS spectrum by requesting access from a Spectrum Access System (SAS). If the SAS determines that the CBRS radio spectrum is not being used by a higher-priority user, the SAS grants permission for use of the CBRS radio spectrum.

In aspects, a first UE uses CBRS radio spectrum for peer-to-peer (P2P) communication with a second UE. To obtain a CBRS spectrum grant, a base station that is in communication with the first UE requests CBRS spectrum access from the SAS on behalf of the UEs. If the base station receives a CBRS spectrum grant from the SAS, the base station configures the UEs for P2P communication according to the CBRS grant. In requesting and receiving the CBRS spectrum grant, the base station is performing the role of a Domain Proxy as defined in the Wireless Innovation Forum standard WINNF-TS-0112.

In another aspect, the request for CBRS spectrum access includes a geographic location or a geographic area (e.g., a geofenced area) where the UEs will conduct P2P communication. The SAS uses the geographic information to determine if there are higher priority users operating in the area where the base station has requested CBRS spectrum access.

In a further aspect, the base station provides a geofenced area to the UEs for CBRS operation. Each of the UEs uses a Global Navigation Satellite System (GNSS) receiver to monitor its geographic location. The UEs use the determined geographic locations to ensure that the UEs conduct CBRS P2P communication only within the geofence area.

The techniques disclosed herein allow P2P communications within a portion of the spectrum that is allocated to Citizens Broadband Radio Service. This can make more complete and/or more efficient usage of the available spectrum. The techniques disclosed herein can prevent P2P communications from interfering with incumbent users and/or higher priority users. In particular, a base station can transmit a configuration that prevents such interference by permitting P2P communications only on a specific frequency resource (e.g., one or more channels), within a specific geographic location and/or geographic area and/or for a specific time.

While features and concepts of the described systems and methods for a peer-to-peer Citizens Broadband Radio Service grant can be implemented in any number of different environments, systems, devices, and/or various configurations, aspects of a peer-to-peer Citizens Broadband Radio Service grant are described in the context of the following example devices, systems, and configurations.

Example Environment

FIG. 1 illustrates an example environment 100 in which various aspects of a peer-to-peer Citizens Broadband Radio Service grant can be implemented. The example environment 100 includes a user equipment 110 (UE 110), illustrated as UE 111, UE 112, and UE 113 that communicates with one or more base stations 120 (illustrated as base stations 121 and 122), through one or more wireless communication links 130 (wireless link 130), illustrated as wireless links 131 and 132. Each UE 110 can communicate on a peer-to-peer basis with another UE 110, through a local wireless network connection, such as a CBRS wireless connections 133, 134, and 135. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, and the like, or any combination or future evolution thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) core network. The base stations 121 and 122 connect, at 102 and 104 respectively, to the core network 150 via an NG2 interface for control-plane signaling and via an NG3 interface for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170. The base stations 120 may also connect to a Spectrum Access System 180 (SAS 180) to request and receiver CBRS spectrum grants on behalf of the UEs 110.

Example Devices

Figure 2:
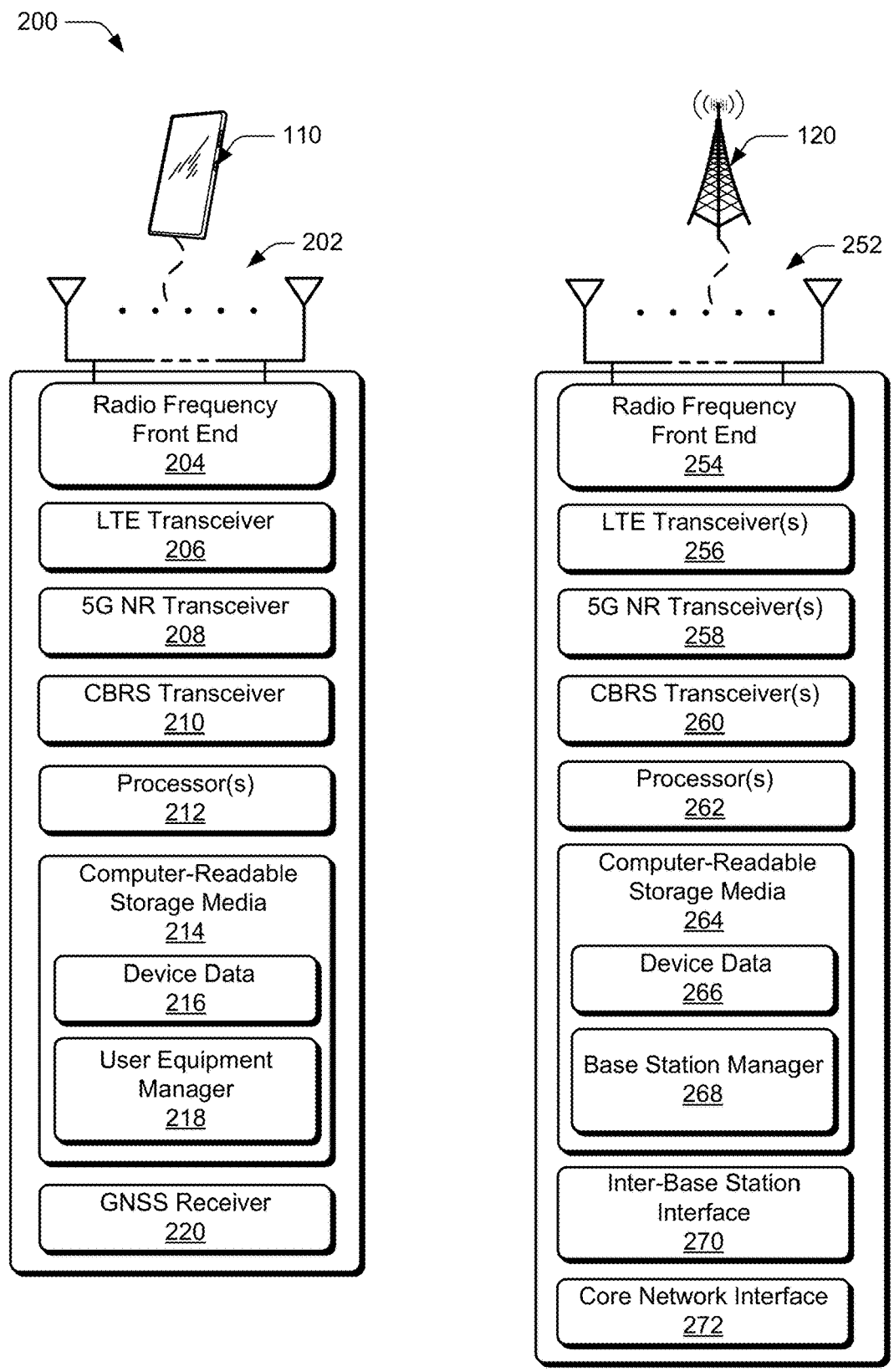
FIG. 2 illustrates an example device diagram that can implement various aspects of a peer-to-peer Citizens Broadband Radio Service grant.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a CBRS transceiver 210 for communicating with base stations 120 in the RAN 140. The RF front end 204 of the user equipment 110 can couple or connect the LTE transceiver 206, the 5G NR transceiver 208, and the CBRS transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and CBRS communication standards and implemented by the LTE transceiver 206, the 5G NR transceiver 208, and/or the CBRS transceiver 210. Additionally, the antennas 202, the RF front end 204, the LTE transceiver 206, the 5G NR transceiver 208, and/or the CBRS transceiver 210 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE, 5G NR, and CBRS communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include a user equipment manager 218. The UE manager 218 can communicate with the antennas 202, the RF front end 204, the LTE transceiver 206, the 5G NR transceiver 208, and/or the CBRS transceiver 210 to monitor the quality of the wireless communication links 130. The user equipment 110 also includes a Global Navigation Satellite System (GNSS) receiver 220. The UE manager 218 can communicate with the GNSS receiver 220 to receive timing and/or geographic positioning signals from GNSS systems, such as the Global Positioning System (GPS), the Global Navigation Satellite System (GLONASS), the Galileo system, or BeiDou Navigation Satellite System (BDS), to derive timing references and/or a current geographic location of the UE 110.

In some implementations, one of the UEs 110 engaged in the P2P CBRS communication does not include the LTE transceiver 206 and/or the 5G NR transceiver 208 to communicate with the RAN 140. For example, the UE 112 may be a General Mobile Radio Service (GMRS) device, a Family Radio Service (FRS) device, a CBRS device (CBSD), or another type of device that includes a CBRS transceiver but does not include an LTE or 5G NR transceiver.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more CBRS transceivers 260 for communicating with the UE 110. The RF front end 254 of the base stations 120 can couple or connect the LTE transceivers 256, the 5G NR transceivers 258, and/or the CBRS transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and CBRS communication standards, and implemented by the LTE transceivers 256, one or more 5G NR transceivers 258, and/or one or more CBRS transceivers 260. Additionally, the antennas 252, the RF front end 254, the LTE transceivers 256, one or more 5G NR transceivers 258, and/or one or more CBRS transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a base station manager 268. Alternately or additionally, the base station manager 268 may be implemented in whole or part as hardware logic or circuitry integrated with or separate from other components of the base stations 120. In at least some aspects, the base station manager 268 configures the LTE transceivers 256, the 5G NR transceivers 258, and the CBRS transceiver(s) 260 for communication with the user equipment 110, as well as communication with a core network, such as the core network 150 and routing user-plane and control-plane data for joint communication.

The base stations 120 include an inter-base station interface 270, such as an Xn and/or X2 interface, which the base station manager 268 configures to exchange user-plane and control-plane data between other base stations 120, to manage the communication of the base stations 120 with the user equipment 110. The base stations 120 include a core network interface 272 that the base station manager 268 configures to exchange user-plane and control-plane data with core network functions and/or entities, as well as communicating with the SAS 180 to coordinate CBRS grant requests for the UE 110.

Network Stack

Figure 3:
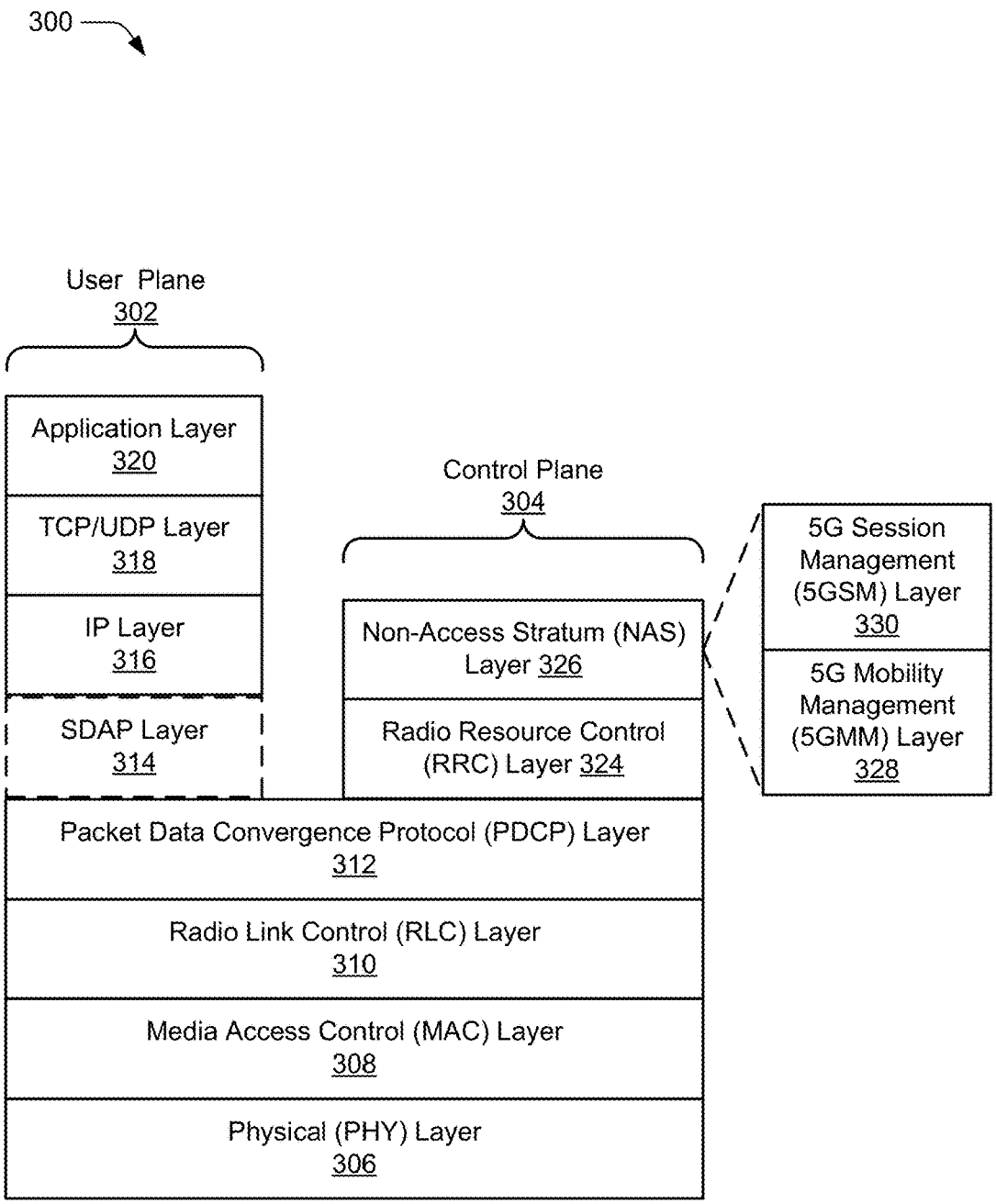
FIG. 3 illustrates an example block diagram of a wireless network stack model in which various aspects of a peer-to-peer Citizens Broadband Radio Service grant can be implemented.

FIG. 3 illustrates an example block diagram 300 of a wireless network stack model 300 (stack 300). The stack 300 characterizes a communication system for the example environment 100, in which various aspects of a peer-to-peer Citizens Broadband Radio Service grant can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released.

Generally, the RRC layer 324 supports 3GPP access but does not support non-3GPP access (e.g., WLAN communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

Peer-to-Peer CBRS Grants

Figure 4:
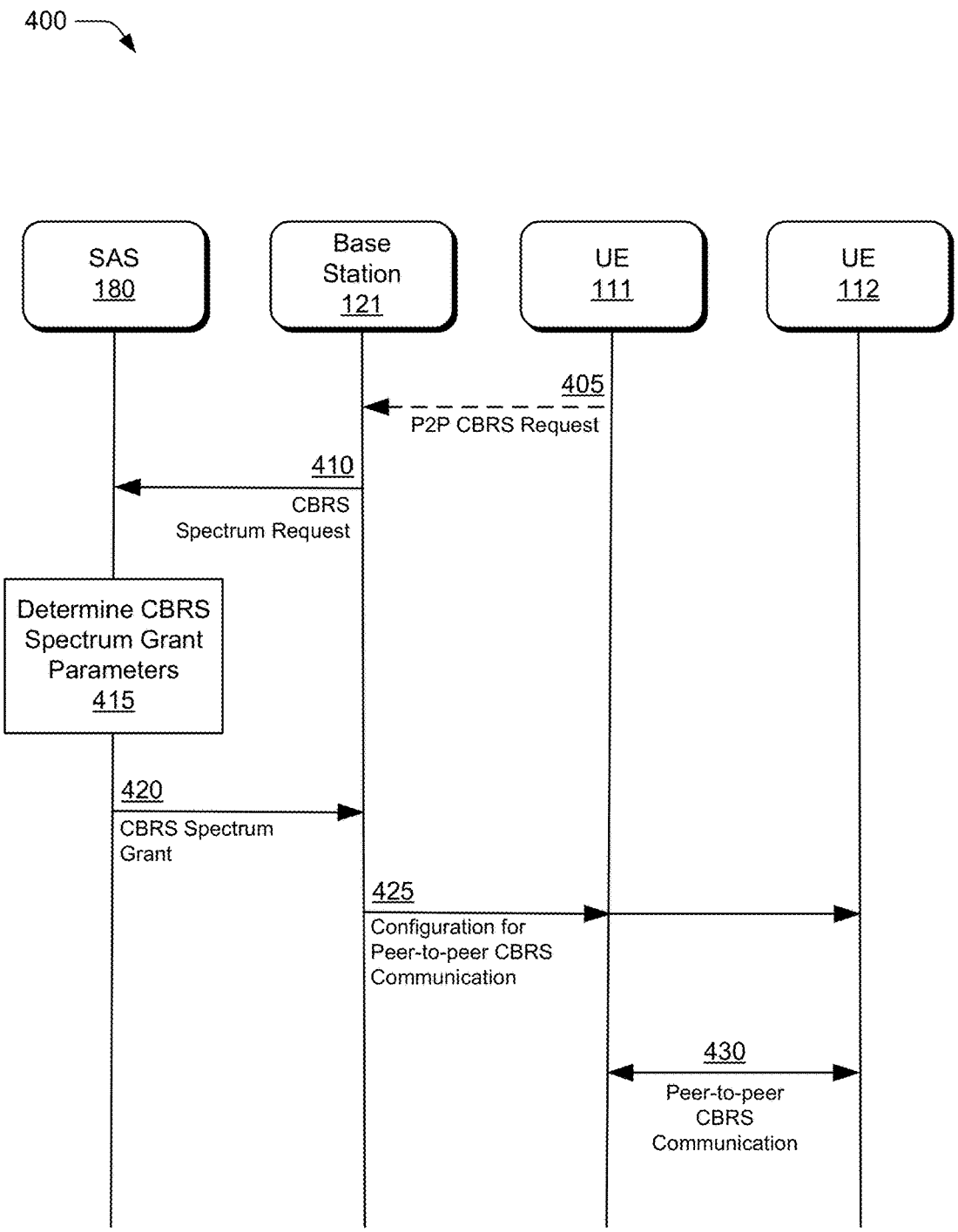
FIG. 4 illustrates details of example data and control transactions between devices engaged in aspects of a peer-to-peer Citizens Broadband Radio Service grant.

FIG. 4 illustrates details of example data and control transactions between devices engaged in aspects of a peer-to-peer Citizens Broadband Radio Service grant. In an optional aspect, the UE 111 sends a P2P CBRS Request to the base station 121, at 405. For example, the UE 111 sends a request in a layer three message that may include CBRS capabilities of the UE 111, a CBSD identifier (CBSD-ID) of the UE 111, a geographic location of the UE 111, a desired geofenced area for CBRS operation, or the like. Alternatively or additionally, the base station 121 may determine the CBRS capabilities of the UE 111 from UE Capabilities information received from the UE 111 or determine the geographic location of the UE 111 from other location information received from the UE 111 or determined by the base station 121.

In aspects at 410, the base station 121 sends a CBRS Spectrum Request to the SAS 180 to request a CBRS spectrum grant for the P2P communications between the UE 111 and the UE 112. The CBRS Spectrum Request includes the geographic location and/or region (e.g., a geofence that defines boundaries) for the CBRS operations of the UE 111 and the UE 112. For example, the base station 121 sends a CBRS Spectrum Request message using the core network 150 and the Internet 160 to the SAS 180.

At 415, the SAS 180 determines CBRS spectrum grant parameters for the P2P communication of the UE 111 and the UE 112. The CBRS spectrum grant parameters may include, one or more CBRS radio channels for the P2P communication, a geographic location or geographic region (e.g., a geofence that defines boundaries) for the P2P communication, a time at which the CBRS spectrum grant expires, or the like. Alternatively or optionally, the base station 121 may determine or modify a time at which the CBRS spectrum grant expires, such as determining a time that shortens the duration of the CBRS spectrum grant to be less than the length of the CBRS spectrum grant provided by the SAS 180. For example, the base station 121 and/or functions in the core network 150 may consider current and/or historical mobility of the UE 111 or UE 112 to determine if either UE is likely to exit the geographic region in the CBRS spectrum grant before the expiration time in the CBRS spectrum grant, or whether either UE may be out of range of the coverage area of the RAN 140 and unable to receive a revocation of the CBRS spectrum grant from the SAS 180.

At 420, the SAS sends a CBRS Spectrum Grant to the base station 121. The CBRS Spectrum Grant includes the spectrum grant parameters determined by the SAS 180. In one alternative, if the SAS 180 determines that CBRS spectrum cannot be granted for the P2P communication, the CBRS Spectrum Grant indicates that the CBRS Spectrum Request has been denied by the SAS 180.

At 425, the base station 121 sends the configuration for P2P CBRS communication to the UE 111 and the UE 112. For example, the base station 121 communicates the P2P configuration for one or more CBRS channels for the P2P communication to the UE 111 and the UE 112 in a broadcast message or a dedicated layer three message. The base station 121 may include a geofence configuration in the configuration for the P2P CBRS communication that specifies the geographic area within which the UE 111 and the UE 112 are permitted to operate using the granted CBRS channel. The base station 121 may include a time constraint in the configuration for the P2P CBRS communication that specifies when the CBRS grant expires, as specified by the SAS 180. In the alternative when UE 111 sends a P2P CBRS Request to the base station 121, at 405, and the SAS 180 denies the CBRS Spectrum Request, the configuration for P2P CBRS communication, at 425, provides an indication to the UE 111 that the CBRS spectrum grant has been denied.

The base station 121 can send the P2P configuration for a CBRS channel using the CBRS radio band or another suitable band, such as a 3GPP LTE or 5G NR band. Additionally or optionally, the base station 121 may use the CBRS band for other (non-P2P) communications.

Alternatively at 425, the UE 111 receives the P2P configuration for the CBRS channel from the base station 121 and forwards the configuration to the UE 112 using a local wireless communication link, (e.g., personal area network, Wi-Fi-Direct, near-field communication (NFC), Bluetooth™, sonar, radar, lidar, ZigBee™, CBRS, or the like). For example, the UE 112 may be out of range of the base station 121 or the UE 112 may be a device includes CBRS communication capability but lacks the ability to communicate directly with the base station 121.

At 430, the UE 111 and the UE 112 conduct P2P communication operations based on the parameters included in the P2P configuration for the CBRS channel that were received from the base station 121. For example, the UE 111 and the UE 112 use respective GNSS receivers 220, to monitor each UE's respective geographic location. Each UE compares its geographic location to the geofence included in the P2P configuration for the CBRS channel. When either UE determines that it has moved outside the geofence, that UE terminates CBRS communications as granted in the P2P configuration for the CBRS channel.

Example Methods

Example methods 500 and 600 are described with reference to FIGS. 5 and 6 in accordance with one or more aspects of a peer-to-peer Citizens Broadband Radio Service grant. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
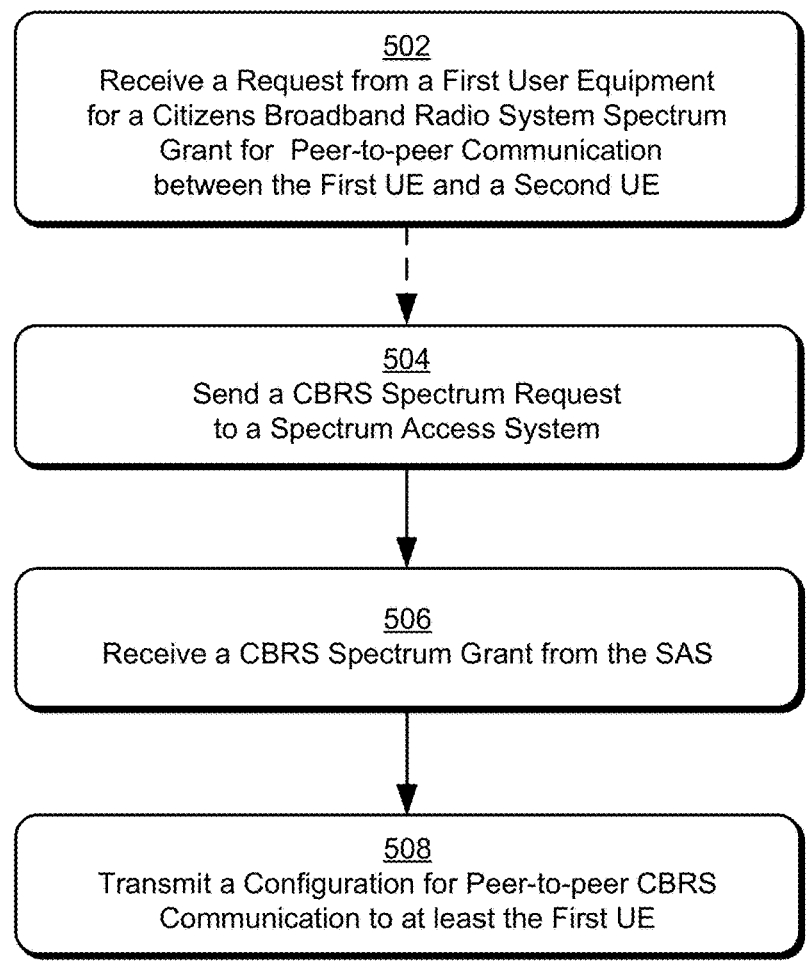
FIG. 5 illustrates an example method of a peer-to-peer Citizens Broadband Radio Service grant as generally related to a base station in accordance with aspects of the techniques described herein.

FIG. 5 illustrates example method(s) 500 of a peer-to-peer Citizens Broadband Radio Service grant as generally related to the base station 121. Optionally at block 502, a base station (e.g., the base station 121) receives a request from a first user equipment (e.g., the UE 111) for a Citizens Broadband Radio System spectrum grant for peer-to-peer communication with a second user equipment (e.g., the UE 112).

At block 504, the base station sends a CBRS spectrum request to a Spectrum Access System (e.g., the SAS 180). For example, the base station sends a CBRS spectrum request that includes CBRS capabilities of the UE 111 and/or UE 112 and parameters for the P2P communication to the SAS 180.

At block 506, the base station receives a CBRS spectrum grant from the SAS. For example, the base station 121 receives the CBRS spectrum grant that includes parameters such as one or more CBRS radio channels for the P2P communication, a geographic location or geographic region for the P2P communication, a time at which the CBRS spectrum grant expires, and so forth.

At block 508, the base station transmits a configuration for P2P CBRS communication to at least the first UE that enables the first UE and the second UE to conduct P2P communication. For example, the base station transmits a configuration for P2P CBRS communication to at least UE 111 that includes the P2P configuration for one or more CBRS channels for the P2P communication, a geofence configuration for the P2P CBRS communication, a time constraint that specifies when the CBRS grant expires, and so forth.

Figure 6:
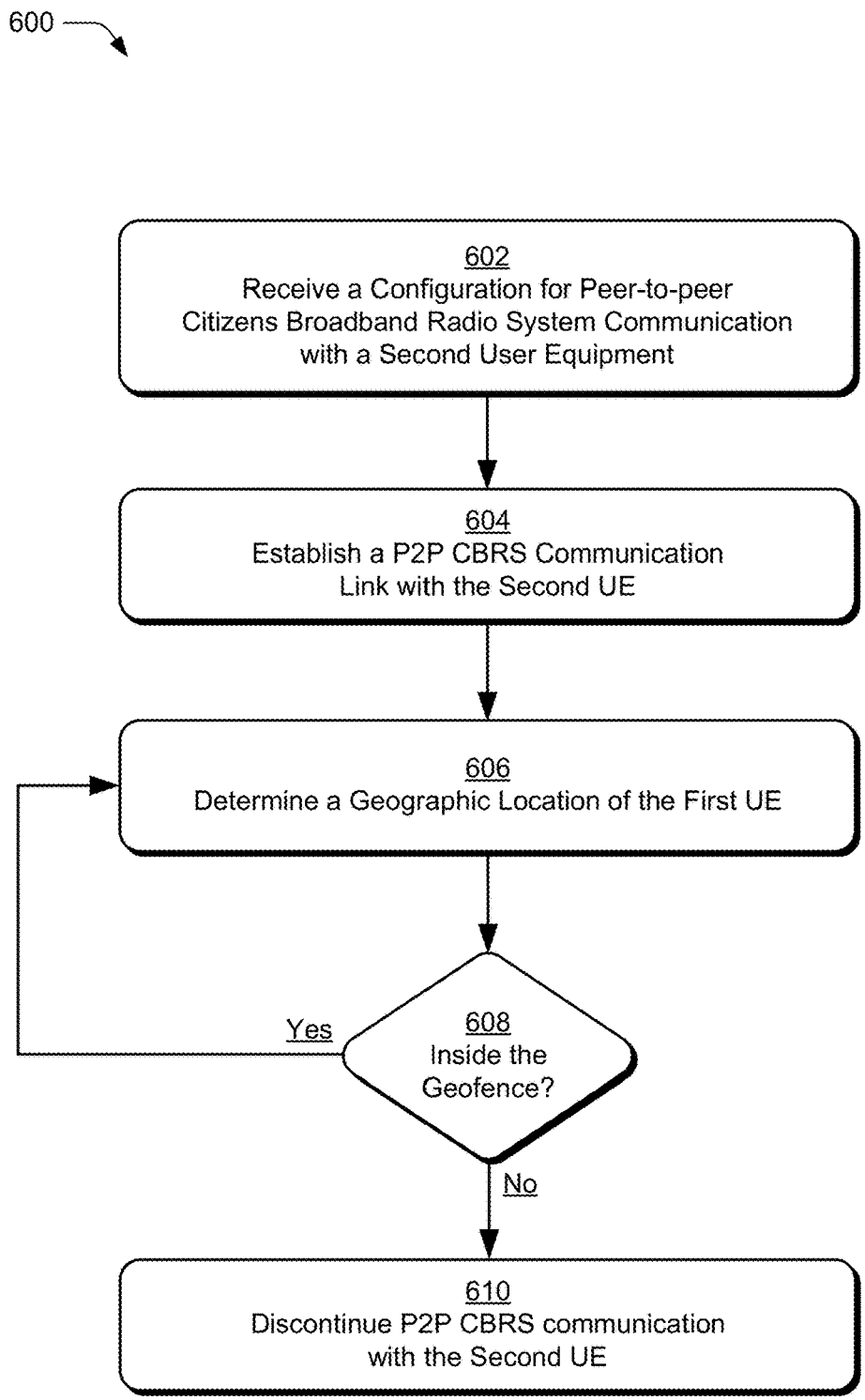
FIG. 6 illustrates an example method of a peer-to-peer Citizens Broadband Radio Service grant as generally related to a user equipment in accordance with aspects of the techniques described herein.

FIG. 6 illustrates example method(s) 600 of a peer-to-peer Citizens Broadband Radio Service grant as generally related to the user equipment 111. At block 602, a first user equipment (e.g., the UE 111) receives a configuration for peer-to-peer CBRS communication with a second user equipment (e.g., the UE 112). For example, the UE 111 receives a configuration for P2P CBRS communication from a base station (e.g., the base station 121) that includes the P2P configuration for one or more CBRS channels for the P2P communication, a geofence configuration for the P2P CBRS communication, a time constraint that specifies when the CBRS grant expires, and so forth.

At block 604, the first UE and the second UE P2P establish a P2P CBRS communication link. For example, using the received configuration for peer-to-peer CBRS communication, the UE 111 and the UE 112 establish and engage in P2P communication.

At block 606, the first UE determines its geographic location and, at 608, compares the determined geographic location to the geofence received in the configuration for peer-to-peer CBRS communication. For example, the UE 111 uses the GNSS receiver (e.g., the GNSS 220) to determine its geographic location and compares the determined geographic location to the geofence.

If at 608, the first UE determines that it is located inside the geofence, P2P CBRS communication can continue, and the first UE periodically determines its geographic location, at 606, and compares each newly determined communication to the geofence.

If, at 608, the first UE determines that it is located outside the geofence, then at 610, the first UE discontinues P2P CBRS communication P2P CBRS communication with the second UE. For example, the UE 111 determines that its geographic location is outside the geofence and terminates P2P CBRS communication with the UE 112.

In the following some examples are described:

Example 1: A method for configuring peer-to-peer communication in a Citizens Broadband Radio Service (CBRS) between a first user equipment and a second user equipment, the method comprising:
  sending, by a base station, a CBRS spectrum request to a Spectrum Access System (SAS);
  receiving, by the base station, a CBRS spectrum grant from the SAS; and
  based on receiving the CBRS spectrum grant, transmitting, by the base station, a configuration for peer-to-peer CBRS communication to at least the first user equipment, the transmitting being effective to enable the first user equipment and the second user equipment to conduct peer-to-peer communication based on the configuration for peer-to-peer CBRS communication.

Example 2: The method of example 1, wherein the base station transmits the configuration for peer-to-peer CBRS communication to at least the first user equipment in a broadcast message or in a layer three message.

Example 3: The method of example 1 or example 2, wherein the transmitting of the configuration for peer-to-peer CBRS communication to at least the first user equipment is effective to direct the first user equipment to forward the configuration for peer-to-peer CBRS communication to the second user equipment.

Example 4: The method of any of the preceding examples, further comprising:
  receiving, by the base station, a request from the first user equipment for the CBRS spectrum grant for peer-to-peer communication; and wherein the sending the CBRS spectrum request is in response to receiving the request.

Example 5: The method of any of the preceding examples, wherein the CBRS spectrum request includes a geographic location or a geographic area.

Example 6: The method of any of the preceding examples, wherein the configuration for peer-to-peer CBRS communication includes a geofence defining a geographic region in which the first user equipment and the second user equipment are allowed to conduct peer-to-peer CBRS communication, and wherein the transmitting the configuration for peer-to-peer CBRS communication directs the first user equipment and the second user equipment to determine if peer-to-peer CBRS communication is allowed by comparing respective geographic locations of the first user equipment and the second user equipment to the geofence.

Example 7: The method of any of the preceding examples, wherein the CBRS spectrum grant includes an expiration time for the CBRS spectrum grant, the method further comprising:
  prior to transmitting the configuration for peer-to-peer CBRS communication, modifying, by the base station, the expiration time to shorten a duration of the CBRS spectrum grant; and
  inserting the modified expiration time in the configuration for peer-to-peer CBRS communication.

Example 8: A base station comprising:
  a radio frequency (RF) transmitter;
  a core network interface; and
  a processor and memory system to implement a base station manager application configured to:
    send, using the core network interface, a Citizens Broadband Radio Service (CBRS) spectrum request to a Spectrum Access System (SAS);
    receive a CBRS spectrum grant from the SAS; and
    transmit, using the RF transmitter, a configuration for peer-to-peer CBRS communication to at least a first user equipment, the transmitting being effective to enable the first user equipment and a second user equipment to conduct peer-to-peer communication based on the configuration for peer-to-peer CBRS communication.

Example 9: The base station of example 8, wherein the base station is configured to transmit the configuration for peer-to-peer CBRS communication to at least the first user equipment in a broadcast message or in a layer three message.

Example 10: The base station of example 8 or example 9, wherein the received CBRS spectrum grant includes a time at which the CBRS spectrum grant expires, and wherein the base station is configured to modify the time at which the CBRS spectrum grant expires for inclusion in the configuration for peer-to-peer CBRS communication.

Example 11: The base station of any of examples 8 to 10, comprising:
  an RF receiver; and
  wherein the base station manager application is configured to:
    receive, using the RF receiver, a request from the first user equipment for the CBRS spectrum grant for peer-to-peer communication; and
  and
    wherein the CBRS spectrum request is sent in response to receiving the request.

Example 12: The base station of example 11, wherein the RF receiver is a Long Term Evolution (LTE) receiver, a Fifth Generation New Radio (5G NR) receiver, or a CBRS receiver.

Example 13: The base station of any of examples 8 to 12, wherein the CBRS spectrum request includes a geographic location or a geographic area.

Example 14: The base station of any of examples 8 to 13, wherein the configuration for peer-to-peer CBRS communication includes a geofence defining a geographic region in which the first user equipment and the second user equipment are allowed to conduct peer-to-peer CBRS communication, and wherein the transmitting the configuration for peer-to-peer CBRS communication directs the first user equipment and the second user equipment to determine if peer-to-peer CBRS communication is allowed by comparing respective geographic locations of the first user equipment and the second user equipment to the geofence.

Example 15: The base station of any of examples 8 to 14, wherein the CBRS spectrum grant includes an expiration time for the CBRS spectrum grant; and
  wherein the base station manager application is configured to:
    prior to the transmission of the configuration for peer-to-peer CBRS communication, modify the expiration time to shorten a duration of the CBRS spectrum grant; and
    insert the modified expiration time in the configuration for peer-to-peer CBRS communication.

Example 16: The base station of any of examples 8 to 15, wherein the RF transmitter is a Long Term Evolution (LTE) transmitter, a Fifth Generation New Radio (5GNR) transmitter, or a CBRS transmitter.

Example 17: A method for configuring peer-to-peer communication in a Citizens Broadband Radio Service (CBRS) between a first user equipment and a second user equipment, the method comprising:
- receiving, by the first user equipment, a configuration for peer-to-peer CBRS communication with the second user equipment, the configuration including a geofence that defines a geographic region for the peer-to-peer CBRS communication;
- establishing a peer-to-peer CBRS communication link with the second user equipment;
- determining a geographic location of the first user equipment; and
- using the determined geographic location of the first user equipment:
  - if the determined geographic location of the first user equipment is inside the geofence, continuing peer-to-peer CBRS communication with the second user equipment; and/or
  - if the determined geographic location of the first user equipment is outside the geofence, discontinuing peer-to-peer CBRS communication with the second user equipment.

Example 18: The method of example 17, further comprising, prior to receiving a configuration for peer-to-peer CBRS communication with the second user equipment:
- transmitting, by the first user equipment, a request to a base station for a CBRS spectrum grant for peer-to-peer communication between the first user equipment and the second user equipment.

Example 19: The method of example 17 or example 18, further comprising:
- forwarding, by the first user equipment, the received configuration for peer-to-peer CBRS communication received to the second user equipment.

Example 20: The method of any of examples 17 to 19, wherein the first user equipment receives the configuration for peer-to-peer CBRS communication from the base station in a layer three message or in a broadcast message.

Example 21: A user equipment configured to perform the method of any of examples 17 to 20.

Example 22: A computer-readable medium comprising instructions which, when executed by a processor, cause an apparatus comprising the processor to perform the method of any of examples 1 to 7 or 17 to 21.

Although aspects of a peer-to-peer Citizens Broadband Radio Service grant have been described in language specific to features and/or methods, the subject of the appended claims is not necessarily limited to the specific features or methods described. Rather, the specific features and methods are disclosed as example implementations of a peer-to-peer Citizens Broadband Radio Service grant, and other equivalent features and methods are intended to be within the scope of the appended claims. Further, various different aspects are described, and it is to be appreciated that each described aspect can be implemented independently or in connection with one or more other described aspects.

The techniques disclosed herein may be used to allow peer-to-peer communications within portions of the spectrum other than, or in addition to, the 3,550 MHz to 3,700 MHz frequency band that is allocated to CBRS. For example, the techniques disclosed herein can be used to allow peer-to-peer communications within portions of the spectrum allocated to Licensed Shared Access (LSA), e.g., the 2,300 to 2,400 MHz frequency band. References to CBRS within the present disclosure may be substituted for, or supplemented with, references to LSA or other similar technologies.

What is claimed is:

1. A method for configuring peer-to-peer communication in a Citizens Broadband Radio Service (CBRS) between a first user equipment and a second user equipment, the method comprising:
- sending, by a base station, a CBRS spectrum request to a Spectrum Access System (SAS);
- receiving, by the base station, a CBRS spectrum grant from the SAS; and
- based on receiving the CBRS spectrum grant, transmitting, by the base station, a configuration for peer-to-peer CBRS communication to at least the first user equipment, the transmitting being effective to enable the first user equipment and the second user equipment to conduct peer-to-peer communication based on the configuration for peer-to-peer CBRS communication.

2. The method of claim 1, wherein the base station transmits the configuration for peer-to-peer CBRS communication to at least the first user equipment in a broadcast message or in a layer three message.

3. The method of claim 1 or claim 2, wherein the transmitting of the configuration for peer-to-peer CBRS communication to at least the first user equipment is effective to direct the first user equipment to forward the configuration for peer-to-peer CBRS communication to the second user equipment.

4. The method of claim 1, further comprising:
- receiving, by the base station, a request from the first user equipment for the CBRS spectrum grant for peer-to-peer communication; and
- wherein the sending the CBRS spectrum request is in response to receiving the request.

5. The method of claim 1, wherein the CBRS spectrum request includes a geographic location or a geographic area.

6. The method of claim 1, wherein the configuration for peer-to-peer CBRS communication includes a geofence defining a geographic region in which the first user equipment and the second user equipment are allowed to conduct peer-to-peer CBRS communication.

7. The method of claim 1, wherein the CBRS spectrum grant includes an expiration time for the CBRS spectrum grant, the method further comprising:
- prior to transmitting the configuration for peer-to-peer CBRS communication, modifying, by the base station, the expiration time to shorten a duration of the CBRS spectrum grant; and
- inserting the modified expiration time in the configuration for peer-to-peer CBRS communication.

8. A base station comprising:
- a radio frequency (RF) transmitter;
- a core network interface;
- a processor; and
- instructions for a base station manager application that are executable by the processor to configure the base station to:
  - send a Citizens Broadband Radio Service (CBRS) spectrum request to a Spectrum Access System (SAS);
  - receive a CBRS spectrum grant from the SAS; and
  - based on the reception of the CBRS spectrum grant, transmit a configuration for peer-to-peer CBRS communication to at least a first user equipment, the transmitting being effective to enable the first user equipment and a second user equipment to conduct peer-to-peer communication based on the configuration for peer-to-peer CBRS communication.

9. The base station of claim 8, wherein the base station transmits the configuration for peer-to-peer CBRS communication to at least the first user equipment in a broadcast message or in a layer three message.

10. The base station of claim 8, wherein the transmitting of the configuration for peer-to-peer CBRS communication to at least the first user equipment is effective to direct the first user equipment to forward the configuration for peer-to-peer CBRS communication to the second user equipment.

11. The base station of claim 8, wherein the instructions for a base station manager application are further executable by the processor to configure the base station to:
 receive a request from the first user equipment for the CBRS spectrum grant for peer-to-peer communication; and
 wherein sending the CBRS spectrum request is in response to the reception of the request.

12. The base station of claim 8, wherein the CBRS spectrum request includes a geographic location or a geographic area.

13. The base station of claim 8, wherein the configuration for peer-to-peer CBRS communication includes a geofence defining a geographic region in which the first user equipment and the second user equipment are allowed to conduct peer-to-peer CBRS communication.

14. The base station of claim 8, wherein the CBRS spectrum grant includes an expiration time for the CBRS spectrum grant, and wherein the instructions for a base station manager application are further executable by the processor to configure the base station to:
 prior to the transmission of the configuration for peer-to-peer CBRS communication, modify the expiration time to shorten a duration of the CBRS spectrum grant; and
 insert the modified expiration time in the configuration for peer-to-peer CBRS communication.

15. A method for configuring peer-to-peer communication in a Citizens Broadband Radio Service (CBRS) between a first user equipment and a second user equipment, the method comprising:
 transmitting, by the first user equipment, a request to a base station for a CBRS spectrum grant for peer-to-peer CBRS communication between the first user equipment and the second user equipment, the request including a geographic location of the first user equipment or a desired geofenced area for the peer-to-peer CBRS communication;
 receiving, by the first user equipment, a configuration for peer-to-peer CBRS communication with the second user equipment, the configuration including a geofence that defines a geographic region for the peer-to-peer CBRS communication;
 establishing a peer-to-peer CBRS communication link with the second user equipment;
 determining the geographic location of the first user equipment; and
 using the determined geographic location of the first user equipment:
  if the determined geographic location of the first user equipment is inside the geofence, continuing peer-to-peer CBRS communication with the second user equipment; and/or
  if the determined geographic location of the first user equipment is outside the geofence, discontinuing peer-to-peer CBRS communication with the second user equipment.

16. The method of claim 15, further comprising:
 forwarding, by the first user equipment, the received configuration for peer-to-peer CBRS communication received to the second user equipment.

17. The method of claim 15 or 16, wherein the first user equipment receives the configuration for peer-to-peer CBRS communication from the base station in a layer three message or in a broadcast message.

18. A first user equipment comprising:
 a radio frequency (RF) transmitter;
 a processor; and
 instructions for a user equipment manager application that are executable by the processor to configure the first user equipment to:
  transmit a request to a base station for a Citizens Broadband Radio Service (CBRS) spectrum grant for peer-to-peer CBRS communication between the first user equipment and a second user equipment, the request including a geographic location of the first user equipment or a desired geofenced area for the peer-to-peer CBRS communication;
  receive a configuration for peer-to-peer CBRS communication with the second user equipment, the configuration including a geofence that defines a geographic region for the peer-to-peer CBRS communication;
  establish a peer-to-peer CBRS communication link with the second user equipment;
  determine the geographic location of the first user equipment; and
  using the determined geographic location of the first user equipment:
   if the determined geographic location of the first user equipment is inside the geofence, continue peer-to-peer CBRS communication with the second user equipment; and/or
   if the determined geographic location of the first user equipment is outside the geofence, discontinue peer-to-peer CBRS communication with the second user equipment.

19. The first user equipment of claim 18, wherein the instructions for a user equipment manager application are executable by the processor to further configure the first user equipment to:
 forward the received configuration for peer-to-peer CBRS communication received to the second user equipment.

20. The first user equipment of claim 18, wherein the first user equipment receives the configuration for peer-to-peer CBRS communication from the base station in a layer three message or in a broadcast message.

* * * * *